(12) United States Patent
Haug et al.

(10) Patent No.: US 6,390,276 B1
(45) Date of Patent: May 21, 2002

(54) METHODS AND APPARATUS FOR PACKAGING UNSTABLE PRODUCTS

(75) Inventors: Dale E. Haug; Daniel L. Floding, both of Alexandria, MN (US)

(73) Assignee: Douglas Machine, Alexandria, MN (US)

(*) Notice: Subject to any disclaimer, the term of this patent is extended or adjusted under 35 U.S.C. 154(b) by 0 days.

(21) Appl. No.: 09/590,717

(22) Filed: Jun. 8, 2000

(51) Int. Cl.$^7$ .............................................. B65G 17/32
(52) U.S. Cl. .................... 198/377.01; 198/617
(58) Field of Search ............... 198/377.01, 617

(56) References Cited

U.S. PATENT DOCUMENTS

| | | | | |
|---|---|---|---|---|
| 2,762,274 A | * | 9/1956 | Kerr | 198/377.01 |
| 3,189,158 A | * | 6/1965 | Lucas | 198/412 |
| 3,409,115 A | * | 11/1968 | Porcaro | 198/418.1 |
| 3,952,874 A | * | 4/1976 | Owen | 209/73 |
| 4,036,362 A | * | 7/1977 | Ullman | 206/432 |
| 4,394,933 A | * | 7/1983 | Ackley | 221/173 |
| 4,483,526 A | * | 11/1984 | Bulka et al. | 270/54 |
| 4,579,517 A | * | 4/1986 | Biggs | 425/510 |
| 4,851,072 A | * | 7/1989 | Kontz | 156/453 |
| 6,182,422 B1 | * | 2/2001 | Andersen et al. | 53/442 |

FOREIGN PATENT DOCUMENTS

EP    471450 A1 * 2/1992

* cited by examiner

Primary Examiner—Paul N. Dickson
Assistant Examiner—Xuan Lan Nguyen
(74) Attorney, Agent, or Firm—Alan Kamrath Rider Bennett, Egan & Arundel, LLP

(57) ABSTRACT

Apparatus (10) for packaging products (P) includes a mechanism (84) for accumulating, metering, and creating an array of products (P) in a pack pattern. The array of products (P) in a conveying orientation is transferred to a tray (36), and the tray (36) and the entire pack pattern of products (P) supported thereon are rotated to a second arrangement where the products (P) in the conveying orientation in the tray (36) are perpendicular to the conveying direction. The products (P) are pushed from the trays (36) moving in the conveying direction into cartons (C) moving at the same speed as the trays (36). In the preferred form, the trays (36) are rotatably mounted to carriers (12) moving along a path defined by roller chains (22). A cam follower (48) on a crank arm (46) extending from a spindle (44) rotatably mounting the tray (36) to the carrier (12) travels in a cam track (50) to rotate the tray (36) relative to the carrier (12) between the first and second arrangements.

28 Claims, 3 Drawing Sheets

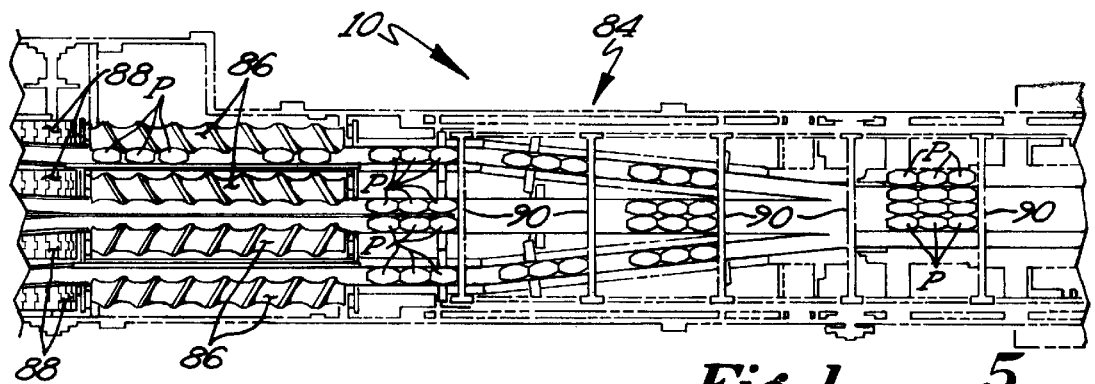
Fig 1
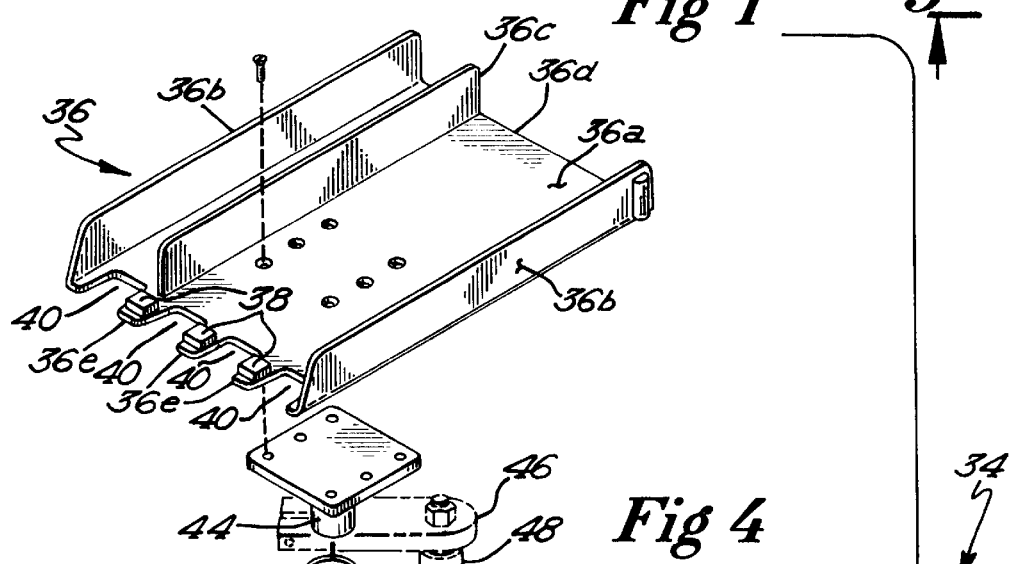
Fig 4
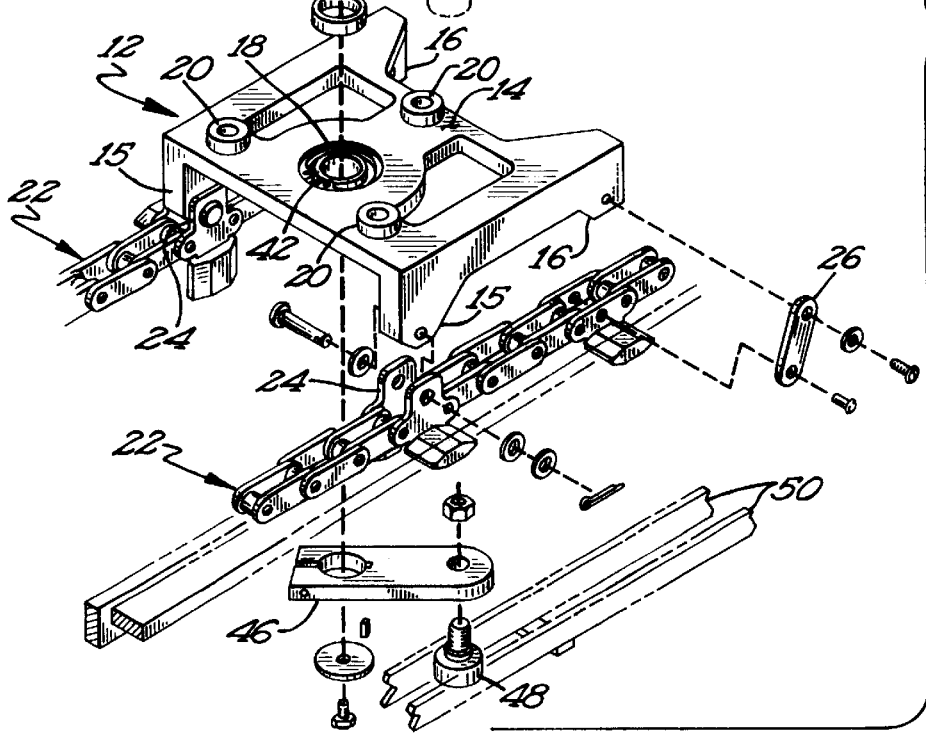

METHODS AND APPARATUS FOR PACKAGING UNSTABLE PRODUCTS

BACKGROUND

The present invention generally relates to methods and apparatus for packaging products, particularly relates to packaging methods and apparatus for products which are unstable during conveying, and specifically relates to packaging methods and apparatus for products having widths which are a multiple of their depths.

The benefits of mechanically handling products in the packaging of such products in cartons are well known, and there is a continual desire to increase operating speeds and efficiency as well as to handle specialty products having characteristics that detract from their ability to be mechanically handled. One such type of specialty product that has posed problems is a product having a narrow dimension. Particularly, it is desired that products be inserted into cartons while in a pack pattern by moving the products parallel to the long dimension and with the narrow dimension leading. As products are moved into the carton in a direction generally perpendicular to the direction that the products are received and accumulated from the production equipment, it is necessary to turn the products in the packaging apparatus. Prior to the present invention, the individual products were turned during the metering phase of the packaging operation. Handling each product in the remaining phases of packaging operation decreases efficiencies because of the need to deal with each individual product and because of the need to convey the products with its long dimension leading causing the product to be less stable while being conveyed.

Thus, a need continues to exist for methods and apparatus for packaging products having differing conveying stability according to their conveying orientation, which have high operating speeds and efficiency, and which otherwise overcome the problems and deficiencies in prior packaging methods and apparatus.

SUMMARY

The present invention solves this need and other problems in the field of product packaging by providing, in the preferred form, a tray rotated about a vertical axis from a first arrangement where the tray unobstructed front edge is located in front of the back edge and a second arrangement where the tray unobstructed front edge is located to the side of the back edge while the tray is moving along a horizontal portion of a path. Product in the most preferred form in a pack pattern is received while the tray is in the first arrangement and slid past the tray obstructed front edge while the tray is in the second arrangement and into a carton.

It is thus an object of the present invention to provide novel methods and apparatus for mechanically handling products.

It is further an object of the present invention to provide such novel product handling methods and apparatus having particular utility in the packaging of products having differing conveying stability according to their conveying orientation.

It is further an object of the present invention to provide such novel product handling methods and apparatus having high operating speeds and efficiency.

It is further an object of the present invention to provide such novel product handling methods and apparatus turning an entire pack pattern of product to allow the product to be conveyed and/or pushed in an orientation with maximum conveying stability.

It is further an object of the present invention to provide such novel product handling methods and apparatus where product is metered and placed into pack patterns while oriented with their maximum conveying stability.

It is further an object of the present invention to provide such novel product handling methods and apparatus having particular utility in the packaging of products having widths which are a multiple times their depths.

These and further objects and advantages of the present invention will become clearer in light of the following detailed description of an illustrative embodiment of this invention described in connection with the drawings.

BRIEF DESCRIPTION OF THE DRAWINGS

The illustrative embodiment may best be described by reference to the accompanying drawings where:

FIGS. 1–3 show a top view of an apparatus for handling products utilizing methods in accordance with the preferred teachings of the present invention, with portions being shown in phantom.

FIG. 4 shows an exploded perspective view of a portion of the product handling apparatus of FIG. 1, with portions being shown in phantom.

Figure 2:
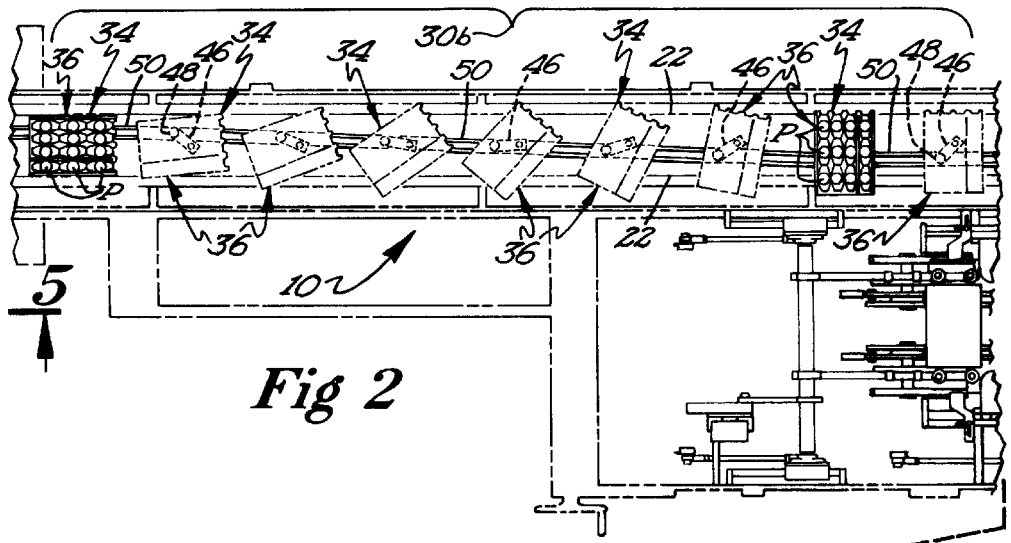
Figure 3:
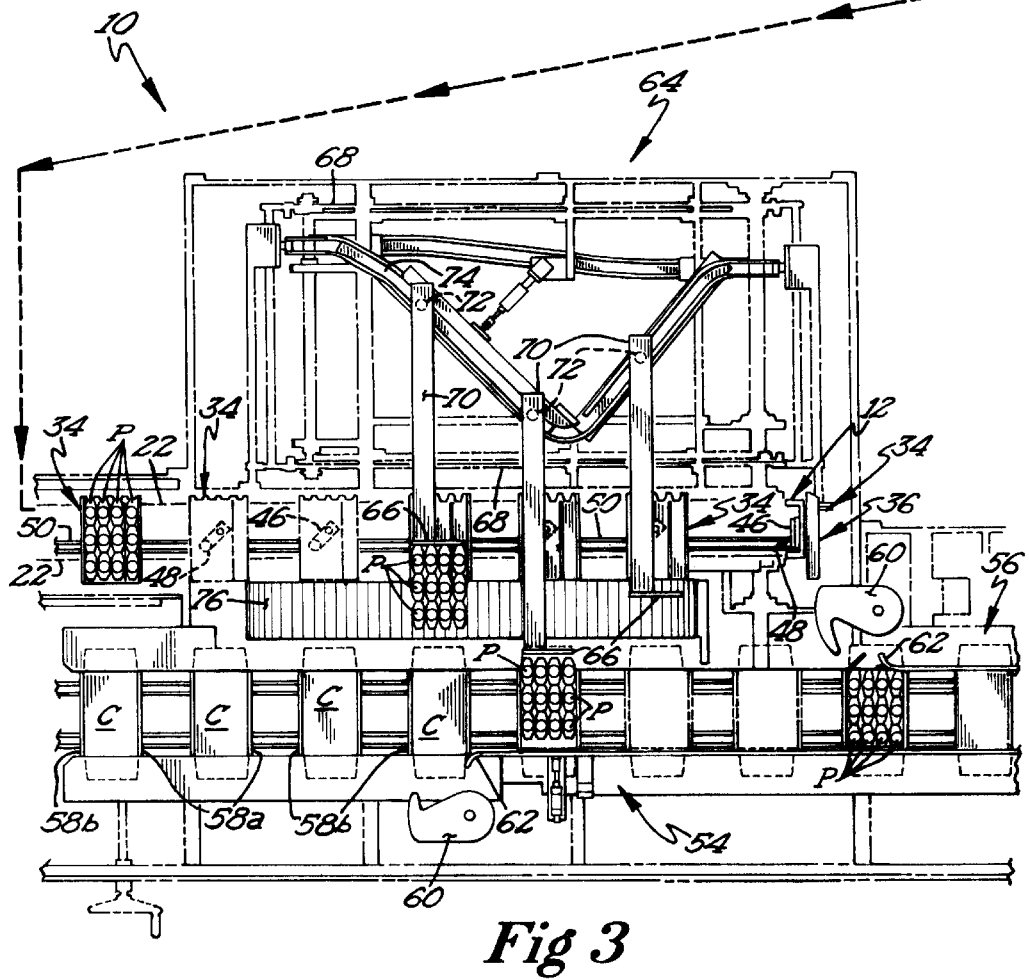
Figure 5:
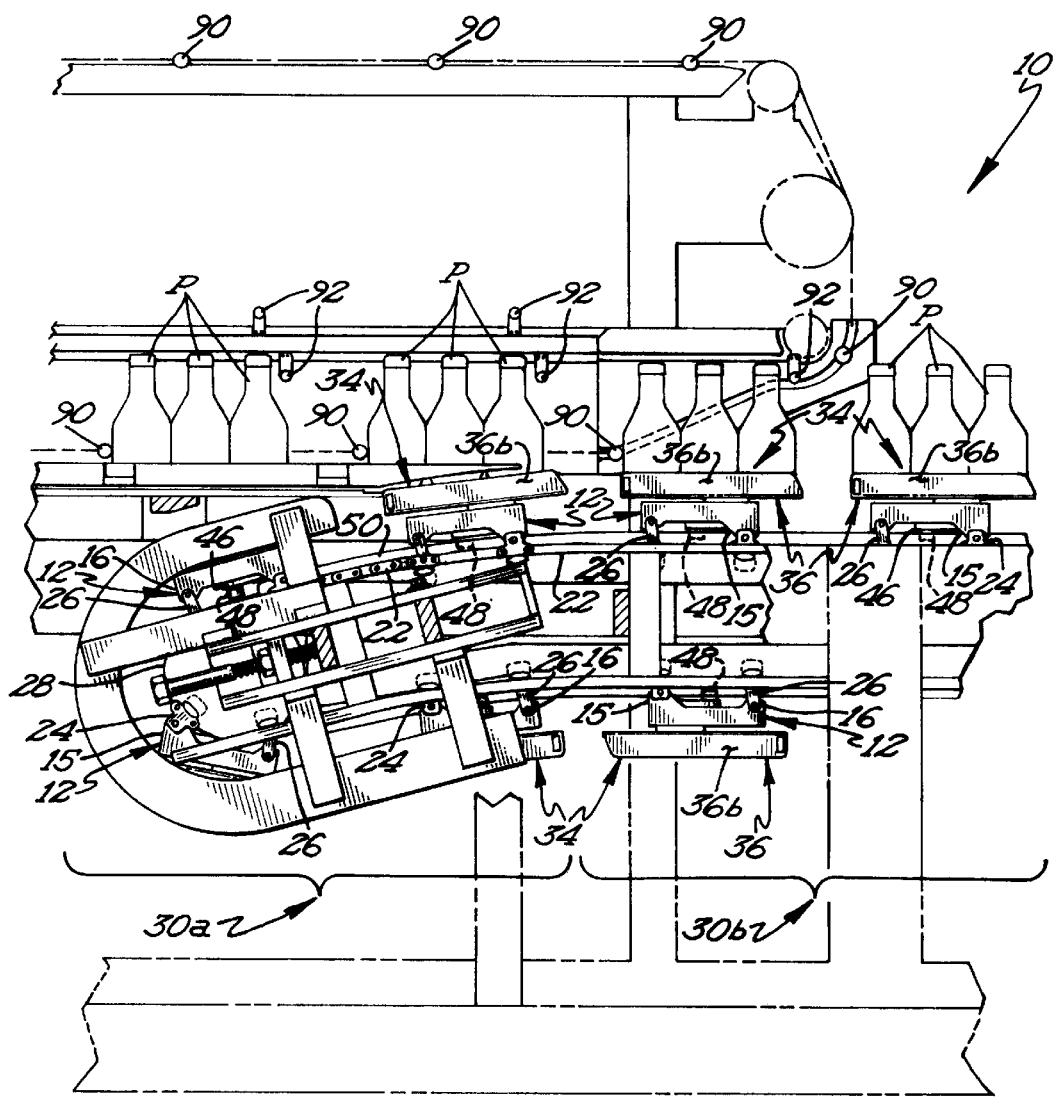
FIG. 5 shows a partial, side view of the product handling apparatus of FIGS. 1–3 according to view line 5—5 of FIGS. 1 and 2, with portions being shown in phantom.
Figure 6:
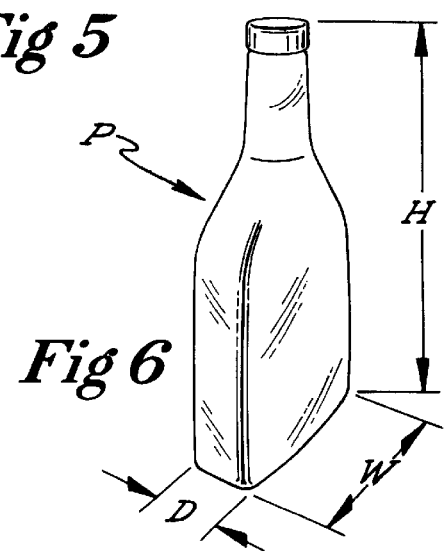
FIG. 6 shows a perspective view of an example of a product which could be mechanically handled by the product handling apparatus of FIGS. 1–3.

All Figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various Figures of the drawings, the same numerals designate the same or similar parts. Furthermore, when the terms "top", "bottom", "first", "second", "side", "end", "edge", "front", "back", "inner", "outer", "upper", "lower", and similar terms are used herein, it should be understood that these terms have reference only to the structure shown in the drawings as it would appear to a person viewing the drawings and are utilized only to facilitate describing the preferred embodiment.

DESCRIPTION OF THE PREFERRED EMBODIMENT

Apparatus for packaging a pack pattern of a plurality of products according to the preferred teachings of the present invention is shown in the drawings and generally designated 10. In the preferred form, apparatus 10 has special utility for products P having dimensions having greater stability when conveyed in a first orientation than in an alternate orientation rotated 90° from the first orientation. As an example, products could have a width W (the long dimension) which is a multiple times its depth D (the narrow dimension) such as twice depth D, and in the preferred form has a height H which is considerably greater than its width W and depth D such as twice width W and four times depth D. Examples of such products include but are not limited to salad dressing bottles, alcohol bottles, underarm deodorants, and the like. In particular, if product P were conveyed or otherwise moved in a conveying direction with its long dimension leading or in other words parallel to its depth D and perpendicular to its width W, products P would have a tendency to tip by pivotable movement about a front or a back edge as a result of a change in speed in the conveying direction and thus are less stable than when product P is conveyed in the conveying direction parallel to its width W and perpendicular to its depth or in other words with its narrow dimension leading.

According to the preferred teachings of the present invention, apparatus 10 includes a carrier 12 including a platform 14 having first and second front ears 15 depending from the front comers and first and second back ears 16 depending from the back comers. Platform 14 includes an extended, stepped passage 18 and a multiplicity of support bearings 20 rotatably mounted to the upper surface thereof. It can be appreciated that platform 14 can be shaped and/or include removed portions for minimizing mass and material and in the most preferred form is formed by machining from a single piece of material such as aluminum.

Apparatus 10 according to the teachings of the present invention includes suitable provisions 22 for moving a plurality of carriers 12 in a conveying direction along a continuous path. In the most preferred form, provisions 22 are in the form of first and second roller chains arranged in parallel paths of a spacing generally equal to the spacing between ears 15 and between ears 16. In the paths of roller chains 22, the lower run of roller chains 22 is located vertically underneath the upper run of roller chains 22. Roller chains 22 include pairs of tabs 24 upstanding from links of roller chains 22. In the most preferred form, first ears 15 are directly pivotally attached to tabs 24 of roller chains 22 whereas second ears 16 are pivotally attached to the outer ends of linkages 26 having their inner ends pivotally attached to links of roller chains 22 intermediate their ends. In the most preferred form, the pivotable attachment of ears 16 to linkages 26 is offset rearwardly in the conveying direction from the pivotable attachment of linkages 26 to roller chains 22. It can then be appreciated that the attachment of carriers 12 to roller chains 22 in the manner shown and described allows chains 22 to travel along non-linear paths such as around sprockets 28 even though platform 14 and carrier 12 maintain a generally planar condition. However, it can be appreciated that other manners of attachment of carriers 12 to roller chains 22 can be utilized to allow travel along non-linear paths including but not limited to having the inner ends of linkages 26 being attached to tabs 24 upstanding from the links of roller chains 22 rather than directly to the links of roller chains 22, or the like. Roller chains 22 between sprockets 28 are suitably supported in apparatus 10 such as but not limited to by the use of chain guides of the type disclosed in U.S. Pat. No. 4,810,238, which is hereby incorporated herein by reference, on tabs integrally extending outwardly and downwardly from the links of roller chains 22 and supported on tracks and/or rails so that the upper run of the path includes a first linear entry portion 30a extending at acute angle in the order of 75° upwardly to a second linear, horizontal, elongated portion 30b of the path. It should further be appreciated that provisions 22 can take forms other than roller chains in the path shown or other than roller chains including but not limited to conveyors, belts, and other manners of movement which are known to persons skilled in the art.

Apparatus 10 according to the teachings of the present invention further includes a rotating bucket 34 associated with each of the carriers 12. In particular, each bucket 34 includes a U-shaped tray 36 including a planar, center portion 36a and first and second sidewalls 36b extending perpendicularly from the sides of center portion 36a. Center portion 36a is horizontal in horizontal portion 30b of the path and slideably receives and supports product P thereon. In the most preferred form, a divider wall 36c extends perpendicularly from center portion 36a parallel to, intermediate, and spaced from sidewalls 36b, with divider wall 36c being generally one fourth of the distance between sidewalls 36b from the second sidewall 36b. Sidewalls 36b and divider wall 36c extend from center portion 36a generally vertically in horizontal portion 30b of the path. Center portion 36a of tray 36 includes a front edge 36d that is unobstructed to the passage of product P by sliding from center portion 36a between sidewalls 36b and divider wall 36c. Center portion 36a of tray 36 also includes a back edge 36e which in the most preferred form includes an obstruction 38 to prevent passage of product P by sliding from center portion 36a. In the most preferred form, a plurality of stops 38 are provided along back edge 36e of center portion 36a and in the most preferred form at intervals generally equal to one third of the spacing between sidewalls 36b. In the most preferred form, back edge 36e of center portion 36a, intermediate stops 38 and sidewalls 36b, includes cutout portions 40.

Apparatus 10 further includes suitable provisions for rotatably mounting trays 36 to carriers 12 about an axis that is vertical in horizontal portion 30b of the path. In the preferred form, a bearing 42 is slideably received in passage 18 of carrier 12 and suitably held therein such as by a snap ring. A spindle 44 includes a plate portion suitably secured to center portion 36a such as by screws and a shaft portion rotatably received in carrier 12 by bearing 42 and rotatable relative to carrier 12 thereby. With spindle 44 received in bearing 42, tray 36 rests upon and is supported by support bearings 20. It can then be appreciated that trays 36 can be rotatably mounted to carriers 12 in other manners that are well known to a person skilled in the art.

Apparatus 10 further includes suitable provisions for rotating trays 36 between first and second arrangements relative to carriers 12. In the preferred form, a crank arm 46 is suitably non-rotatably secured to the lower end of the shaft portion of spindle 44 and extends generally perpendicular to the axis thereof. An annular spacer can be provided on the shaft portion of spindle 44, intermediate crank arm 46 and bearing 42. A cam follower 48 in the most preferred form is rotatably attached to the free end of crank arm 46 about an axis which is generally parallel to and spaced from the axis of spindle 44. A stationary cam track 50 of a size for receipt of cam follower 48 is positioned around the path of roller chains 22, with the configuration of cam track 50 resulting in rotation of buckets 36 as buckets 36 traverse along the path of roller chains 22. Specifically, cam track 50 is shaped so that as carriers 12 move along the path, cam follower 48 travels along cam track 50 such that the position of follower 48 in cam track 50 relative to carriers 12 changes resulting in movement of crank arm 46 and pivoting of spindle 44 and tray 36 relative to carrier 12. In particular in a first position of horizontal portion 30b of the path, tray 36 is in a first arrangement where front edge 36d is located in the front of back edge 36e in the conveying direction. Due to the position of cam track 50 extending along horizontal portion 30b and as tray 36 moves to a second position of horizontal portion 30b of the path, tray 36 is rotated to a second arrangement where front edge 36*d* is located to the side of back edge 36*a* in a direction generally perpendicular to the conveying direction. It should then be appreciated that due to the position of cam track 50 extending along the lower run of the path, as tray 36 moves from the horizontal position 30*b* back towards entry position 30*a*, tray 36 is rotated back to its first arrangement.

Apparatus 10 according to the preferred teachings of the present invention includes a mechanism 54 for moving a carton C parallel to the conveying direction of product P. In the most preferred form, mechanism 54 is of the type shown and described in U.S. Pat. No. 4,917,663, which is hereby incorporated herein by reference. In particular, mechanism 54 includes a horizontal conveyor assembly 56 having a multiplicity of leading projections or lugs 58*a* and a multiplicity of trailing projections or lugs 58*b*. Lugs 58*a* and 58*b* operate in pairs for holding carton C in an open condition for slideable receipt of product P. In the most preferred form, carton C is in the form of a blank of a planar construction before being set up and including major and minor panels and flaps which can be folded and glued to form a box for product P. Mechanism 54 includes suitable provisions, not shown, for removing the blanks from a magazine and for setting up the blank in an open condition between lugs 58*a* and 58*b*, with the blank being generally in a U-shape in the preferred form. Mechanism 54 further includes suitable provisions, partially shown, for folding and gluing the blank to form into a box for enclosing product P slideably received therein, with such provisions shown including but not limited to rotating flap folders 60 and stationary flap guides 62. It should be appreciated that carton C and mechanism 54 can take many forms including but not limited to the one shown according to the teachings of the present invention, with the particular form selected being based upon several factors including but not limited to the particular product P being packaged, the floor plan of the location where apparatus 10 is desired to be utilized, the cost and availability of any particular mechanism 54, the tastes of the user or the layout personnel, and the like.

Apparatus 10 according to the preferred teachings of the present invention includes a mechanism 64 for transferring product P from tray 36 into carton C. Generally, in the preferred form, mechanism 64 includes a vertical pushing plate 66 which is moved parallel to the conveying direction at a speed matching carrier 12 and carton C. In the most preferred form shown, plate 66 is moved parallel to the conveying direction by a roller chain drive 68. Pushing plate 66 is simultaneously moved nonparallel to the conveying direction to thereby engage and slide product P from center portion 36*a* of tray 36 past unobstructed front edge 36*d*. In particular, a stud 70 extends from pushing plate 66 opposite product P located on tray 36 and carrying a cam 72 received in an unloader cam track 74. Specifically, in the most preferred form shown, mechanism 64 includes what is referred to in the trade as a barrel cam loader. However, mechanism 64 can include other manners for simultaneously moving pushing plate 66 and/or can be of other forms according to the teachings of the present invention, including but not limited to U.S. Pat. No. 5,052,544, which is hereby incorporated herein by reference. In the most preferred form, mechanism 64 further includes traveling funnel chains 76 located intermediate roller chains 22 and conveyor assembly 56 and moving parallel to the conveying direction and carton moving direction and at a speed matching carriers 12 and carton C. Product P is slid from center portion 36*a* of tray 36 past unobstructed front edge 36*d* onto funnel chains 76 and into cartons C moving in conveyor assembly 56 by movement of plate 66 nonparallel to the conveying direction and carton moving direction.

Apparatus 10 according to the preferred teachings of the present invention includes a mechanism 84 for receiving product P at random infeed rates and placing a plurality of products P in a pack pattern and specifically in an array including at least one row and one column. In particular, mechanism 84 includes a device 86 for metering product P to provide product P at a desired rate and with constant spacing in the conveying direction. Specifically, in the preferred form, metering device 86 is in the form of a plurality of screws or augers extending generally parallel to the conveying direction and including a spiral of a size to accept a single product at a time. Mechanism 84 further includes a plurality of infeed conveyors 88 leading to each of the augers of metering device 86. Since only a single product P can enter the spiral of the auger of metering device 86, product P will abut with the single product entering the auger and slide on infeed conveyor 88 so that product will tend to accumulate on infeed conveyor 88 behind metering device 86, with suitable provisions being provided to maintain product P in their preferred conveying orientation with the narrow dimension leading. It should be appreciated that sufficient product P should be positioned on infeed conveyor 88 to insure that the spirals of the augers are always full of product P.

After leaving metering device 86, product P is in individual lanes and at spaced intervals in the conveying direction. Mechanism 84 includes suitable provisions for bringing the individual lanes together to form the columns of the array and for separating the desired number of products P and closing the intervals between the separated product P to form the rows of the array. As an example, mechanism 84 can include sweep bars 90 which are introduced from above such as after every third product in each individual lane of products P. Sweep bars 90 travel faster than the conveying speed of product P so that sweep bars 90 engage the products P intended to form the last row of the array and push those products P to engage the products P intended to form the second to the last row of the array and push those products P to engage the products P intended to form the third to the last (which is the front row in the preferred form shown) row of the array and so on. Simultaneously, converging the conveyors carrying the individual lanes of products P, using guides for products P, removing guides for products P, and the like, products P are moved such that the columns of products P engage in the array.

In the most preferred form, sweep bars 90 also sweep products P in the form of an array from the conveyors of mechanism 84 into trays 36. In particular, due to the provision of entry portion 30*a*, trays 36 are moved from their inverted condition in the lower run of the path to their upright condition in the upper run of the path when they pass around sprocket 28 and at a level below horizontal portion 30*b* and the conveying level in mechanism 84. As trays 36 move up entry portion 30*a*, they are brought under the array of products P. In the most preferred form, products P are pushed from the conveyor of mechanism 84 onto a transfer deck or slide surface and from slide surface onto center portion 36*a* which are moving at the same speed as sweep bars 90 are pushing products P. Stops 38 abut with the last row of the array of products P, with each stop 38 abutting with two products when the array includes 4 columns. Obstruction 38 in the form of spaced stops allows the slide surface of mechanism 84 to include fingers which extend between stops 38 for ease of transfer of products P from the slide surface onto center portion 36*a*. In the most preferred form, abutment bars 92 are introduced from above before and parallel to the first row of each array of products P to prevent products P from tipping forward as they move from the conveyor of mechanism 84 onto the slide surface or from the slide surface onto center portion 36a.

It should be appreciated that mechanism 84 can take many forms including but not limited to the one shown according to the teachings of the present invention, with the particular form selected being based upon several factors including but not limited to the particular product P being packaged, the floor plan of the location where apparatus 10 is desired to be utilized, the cost and availability of any particular mechanism 84, the tastes of the user or layout personnel, or the like.

Now that the basic construction of apparatus 10 according to the preferred teachings of the present invention have been set forth, a method of operation of apparatus 10 can be explained and some of the advantages of apparatus 10 can be highlighted. In particular, products P are suitably fed to infeed conveyors 88 in an orientation with their widths being generally parallel to the conveying direction and their narrow dimensions leading. It should then be appreciated that product P in such a preferred orientation is considerably more stable than if products P were located on infeed conveyors 88 in an orientation with their depth being generally parallel to the conveying direction and their long dimensions leading as products P in such an orientation have a tendency to tip along their edges such that height H would be parallel to the conveying direction. Products P are then placed in a pack pattern where widths W of products P are parallel to the columns of the array and depths D are parallel to the rows of the array. It should be appreciated that products P in the pack pattern are conveyed in mechanism 84 and transferred to trays 36 with their widths parallel to sidewalls 36b and divider wall 36c and while in their preferred conveying orientation to minimize any tendency of products P to tip even while in the pack pattern. In this regard, the construction of tray 36 is particularly advantageous. In particular, it has been found that pack patterns having greater than three columns have an increased tendency to tip in a direction perpendicularly to the columns. Providing divider wall 36c between the third and fourth columns of product P in the array reduces this tendency of products P to tip in a direction perpendicularly to the columns. Also, if it is desired to package products P in an array including only 3 columns, divider wall 36c can act as the outside side wall in retaining products P in the array and without requiring changeover of trays 36.

After products P have been transferred to trays 36 and while trays 36 are moving in portion 30b of the path, trays 36 are slowly rotated at a speed which does not result in tipping of products P as a result of centrifugal forces. It should be appreciated that tray 36 and the entire pack pattern of products P supported thereon are turned such that products P are now oriented with depths D parallel to the conveying direction of portion 30b of the path and their long dimensions leading in the conveying direction. However, as products P are located on center portion 36a between sidewalls 36b and divider wall 36c, the tendency of products P to tip perpendicular to the columns of the array is virtually eliminated even though they are not in their preferred conveying orientation. Thus, as it is not necessary to deal with each individual product P, apparatus 10 according to the teachings of the present invention can operate at higher speeds and at higher efficiencies.

After trays 36 are turned to their second arrangements where unobstructed front edge 36d is located to the side of back edge 36e in a direction generally perpendicular to the conveying direction and in the most preferred form shown is parallel to the conveying direction, pushing plate 66 moves nonparallel to the conveying direction and in the preferred form generally perpendicular to the conveying direction to thereby engage and slide the array of products P from the planar center portion 36a past unobstructed front edge 36d onto funnel chains 76 and into carton C moving in mechanism 54. It should be appreciated that products P are being pushed by pushing plate 66 with widths W being parallel to the pushing direction so that products P are moved in their most stable orientation to minimize any tendency of products P to tip. After products P are in carton C, pushing plate 66 is moved in a reverse direction and carton C is folded and glued in mechanism 54. It should be appreciated that the packaging method of the present invention is continuous, with the components returning to their initial positions in nonoperative runs of their respective paths.

Thus since the invention disclosed herein may be embodied in other specific forms without departing form the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Apparatus for mechanically handling at least one product including a width and a depth comprising, in combination: at least one carrier moveable in a conveying direction along a horizontal portion of a path from a first position to a second position; and a tray rotatably mounted to the carrier about an axis which is vertical in the horizontal portion of the path and including a planar center portion which is horizontal in the horizontal portion of the path, with the planar center portion slideably receiving and supporting the product thereon and including an unobstructed front edge and a back edge, with the product being slideable from the planar center portion past the unobstructed front edge, with the tray being rotated about the axis as the carrier moves from the first position to the second position from a first arrangement where the unobstructed front edge is located in front of the back edge in the conveying direction in the first position to a second arrangement where the unobstructed front edge is located to the side of the back edge in a direction generally perpendicular to the conveying direction in the second position, with the at least one product being transferred onto the planar center section while the tray is in the first arrangement and being slid from the planar center section past the unobstructed front edge while the tray is in the second arrangement.

2. The apparatus of claim 1 wherein the tray is rotated about the axis by a cam follower mounted to the tray, with the cam follower traveling along a cam track extending along the horizontal portion of the path.

3. The apparatus of claim 2 wherein the tray is rotatably mounted about the axis by a spindle mounted to the tray, with the spindle rotatably received in the carrier; and wherein the cam follower is attached to a crank arm extending generally perpendicular from the spindle.

4. The apparatus of claim 3 wherein the tray further includes first and second, spaced, parallel, sidewalls extending generally vertically from the planar center portion in the horizontal portion of the path and parallel to the conveying direction in the first arrangement, with the product being slideable from the planar center portion between the first and second sidewalls.

5. The apparatus of claim 1 wherein the tray further includes first and second sidewalls extending generally vertically from the planar center portion in the horizontal portion of the path, with the product being slideable from the planar center portion between the first and second sidewalls, and a divider wall extending generally parallel to and intermediate the first and second sidewalls and extending generally vertically from the planar center portion in the horizontal portion of the path; and wherein the tray further includes an obstruction for preventing the product from sliding from the planar center portion past the back edge.

6. Apparatus for mechanically handling at least one product including a width and a depth comprising, in combination: at least one carrier moveable in a conveying direction along a horizontal portion of a path from a first position to a second position; a tray rotatably mounted to the carrier about an axis which is vertical in the horizontal portion of the path and including a planar center portion which is horizontal in the horizontal portion of the path, with the planar center portion slideably receiving and supporting the product thereon and including an unobstructed front edge and a back edge, with the product being slideable from the planar center portion past the unobstructed front edge, with the tray being rotated about the axis as the carrier moves from the first position to the second position from a first arrangement where the unobstructed front edge is located in front of the back edge in the conveying direction in the first position to a second arrangement where the unobstructed front edge is located to the side of the back edge in a direction generally perpendicular to the conveying direction in the second position; and a pushing plate, with the pushing plate being vertical and simultaneously moving parallel to the conveying direction at a speed matching the carrier and moving nonparallel to the conveying direction to thereby engage and slide the product from the planar center portion past the unobstructed front edge.

7. The apparatus of claim 6 wherein the pushing plate includes a stud extending from the pushing plate opposite the product and carrying a cam received in an unloader track for moving the pushing plate.

8. The apparatus of claim 6 further comprising, in combination: means for moving a carton parallel to the conveying direction, with the pushing plate sliding the product from the planar center portion past the unobstructed front edge and onto the carton.

9. The apparatus of claim 8 further comprising, in combination: means for transferring the product onto the planar center portion while the tray is in the first arrangement, with the width of the product being a multiple times the depth, with the product being transferred onto the planar center portion by moving the product with the width parallel to the conveying direction.

10. The apparatus of claim 9 wherein the transferring means transfers a plurality of products in a pack pattern including at least one row and at least one column onto the planar center portion, with the width of the product being arranged parallel to the column of the pack pattern.

11. The apparatus of claim 10 wherein the transferring means transfers the products in the pack pattern including a plurality of rows; and wherein the tray further includes first and second sidewalls extending from the planar center portion and which are generally vertical in the horizontal portion of the path, with the product being slideable from the planar center portion between the first and second sidewalls and a divider wall extending generally parallel to and intermediate the first and second sidewalls, with the transferring means transferring the products with the widths generally parallel to the first and second sidewalls and the divider wall.

12. The apparatus of claim 10 wherein the path is continuous with the horizontal portion being in an upper run and with the path including a lower run located vertically underneath the upper run, with the tray being rotated from the second arrangement to the first arrangement in the lower run.

13. The apparatus of claim 12 wherein the upper run includes an entry portion extending at an acute angle upwardly to the horizontal portion of the path, with the transferring means transferring the product onto the planar center portion while the tray is in the entry portion of the path.

14. The apparatus of claim 13 wherein the path is formed and defined by first and second roller chains, with the carrier including front ears pivotally mounted to the first and second roller chains and back ears, with the back ears pivotally mounted to linkages in turn pivotally mounted to the first and second roller chains.

15. Method for mechanically handling products, with the products each including a width and a depth, comprising: moving a tray in a conveying direction along a horizontal portion of a path, with the tray including a planar center portion for slideably receiving and supporting the product thereon and which is horizontal in the horizontal portion of the path, with the planar center portion of the tray including an unobstructed front edge and a back edge; transferring at least one product onto the planar center portion of the tray in the path while the tray is in a first arrangement where the unobstructed front edge is located in front of the back edge in the conveying direction; rotating the tray about an axis which is vertical in the horizontal portion of the path and after the product is transferred to the planar center portion and while the tray is moving in the conveying direction from the first arrangement to a second arrangement where the unobstructed front edge is located to the side of the back edge in a direction generally perpendicular to the conveying direction; and pushing the product from the tray while moving in the conveying direction and while the tray is in the second arrangement with the product sliding from the planar center portion past the unobstructed front edge.

16. The method of claim 15 wherein transferring at least one product comprises transferring at least one product with the width being parallel to the conveying direction, with the width of the product being a multiple times the depth.

17. The method of claim 16 wherein transferring at least one product comprises transferring a plurality of products in a pack pattern including at least one row and at least one column onto the planar center portion, with the width of the product being arranged parallel to the column of the pack pattern.

18. The method of claim 17 wherein moving the tray comprises moving the tray including first and second sidewalls extending generally vertically from the planar center portion in the horizontal portion of the path, with the product being slideable from the planar center portion between the first and second sidewalls and a divider wall extending generally parallel to and intermediate the first and second sidewalls and extending generally vertically from the planar center portion in the horizontal portion of the path; and wherein transferring at least one product comprises transferring the product with the width generally parallel to the first and second sidewalls.

19. The method of claim 17 further comprising: moving a carton parallel to the conveying direction; and wherein pushing the product comprises simultaneously moving a pushing plate parallel to the conveying direction at a speed matching the tray and nonparallel to the conveying direction to thereby engage and slide the product from the planar center portion past the unobstructed front edge and onto the carton.

20. The method of claim 15 wherein rotating the tray comprises providing a cam track along the horizontal portion of the path; and traveling a cam follower mounted to the tray along the cam track.

21. Method for mechanically handling products, with the products having a base including a width and a depth and having a height, with the product being supportable in an upright manner on the base, comprising: moving a tray horizontally in a conveying direction; moving at least one product with the width of the product parallel to the conveying direction onto the tray moving in the conveying direction; rotating the tray moving in the conveying direction and with the at least one product thereon about a vertical axis until the width of the product on the tray moving in the conveying direction is nonparallel to the conveying direction; and moving the at least one product from the rotated tray in a direction parallel to the width of the product on the rotated tray while the tray is moving in the conveying direction.

22. The method of claim 21 with moving the at least one product comprising moving the at least one product with the width being a multiple times the depth.

23. The method of claim 22 with moving the at least one product comprising moving a plurality of products in a pack pattern including at least one row and at least one column, with the width of the product being arranged parallel to the column of the pack pattern.

24. The method of claim 23 further comprising: moving a carton parallel to the conveying direction, with moving the at least one product from the rotated tray comprising moving the at least one product from the rotated tray onto the carton moving parallel to the conveying direction.

25. Apparatus for mechanically handling products, with the products having a base including a width and a depth and having a height, with the product being supportable in an upright manner on the base, comprising, in combination: at least one carrier moveable in a conveying direction along a horizontal portion of a path; and a tray rotatably mounted to the carrier about an axis which is vertical in the horizontal portion of the path from a first arrangement to a second arrangement, with the tray in the first arrangement while the carrier is moving in the conveying direction adapted to receive the at least one product being moved with the width of the product parallel to the conveying direction and the tray in the second arrangement while the carrier is moving in the conveying direction adapted to have product moved therefrom with the width of the product being moved nonparallel to the conveying direction.

26. The apparatus of claim 25 with the tray adapted to receive the product with the width being a multiple times the depth.

27. The apparatus of claim 26 with the tray adapted to receive a plurality of products in a pack pattern including at least one row and at least one column, with the width of the product being arranged parallel to the column of the pack pattern.

28. The apparatus of claim 27 further comprising, in combination: means for moving a carton parallel to the conveying direction, with the tray in the second arrangement adapted to have product moved from the tray onto the carton.

* * * * *